Patented July 3, 1945

2,379,409

UNITED STATES PATENT OFFICE 2,379,409

PROCESS FOR CHLORINATING POLYMERIC MATERIALS

Reginald George Robert Bacon and William John Roy Evans, Manchester, England, assignors to Imperial Chemical Industries Limited, a corporation of Great Britain No Drawing. Application June 30, 1941, Serial No. 400,462. In Great Britain July 3, 1940

9 Claims. (Cl. 204—163)

This invention relates to the manufacture of chlorinated polymeric materials and more particularly to the chlorination of polyvinyl chloride.

It has already been proposed to chlorinate polymerised vinyl chloride by acting with chlorine in a solution or suspension of the polymer in a solvent or in a swelling agent for instance in carbon tetrachloride or in tetrachloroethane. Working according to this proposal, however, involves using large quantities of organic liquids of which there is always a certain loss. Further, if polymerised vinyl chloride, which is to be chlorinated is obtained by the convenient process of polymerising vinyl chloride in an aqueous emulsion, it is necessary to isolate the polymer prior to its chlorination. This isolation involves manufacturing steps such as the coagulation of the dispersion, washing and drying.

We have now found that the chlorination of polyvinyl chloride can be carried out effectively by passing chlorine into an aqueous medium containing the polyvinyl chloride in suspension. Solvents and swelling agents for the polyvinyl chloride may also be present, singly or in admixture and the reaction zone may be exposed to actinic radiation.

Accordingly one of the objects of this invention is to provide a process for the production of chlorinated polyvinyl chloride by which the utilisation of large quantities of organic liquids with the attendant loss of solvent may be avoided. Further objects of the invention will become apparent in the ensuing description.

The invention may be applied to polyvinyl chloride obtained in any known manner. It is particularly applicable, however, to polyvinyl chloride obtained in aqueous emulsion by maintaining an aqueous emulsion of monomeric vinyl chloride, which may contain other ingredients such as emulsifying, dispersing or buffering agents, polymerisation catalysts or plasticisers, at a suitable pressure and temperature until the desired degree of polymerisation has been attained, since such emulsions may be further chlorinated without isolating the polyvinyl chloride.

Suitable solvents or swelling agents for the polymers, which may be added to the aqueous suspensions in proportions as high for example as 16 parts to one part of the polymer are the chlorinated hydrocarbons such as ethylene dichloride or tetrachloroethane. In general, however, the solvents and swelling agents are used in small amounts, for example 8 parts to one part of the polymer is usually sufficient for the rapid production of highly chlorinated materials with useful physical properties, but smaller or greater proportions may be used as desired or the chlorination may be effected in the absence of solvents and swelling agents.

One method of carrying out the invention is to pass chlorine into the aqueous suspension of the polymerised vinyl chloride at a convenient rate until the desired degree of chlorination has been effected. Interaction between the chlorine and the polymer may be accelerated by operating under suitable physical conditions. For instance the chlorination is usually effected at least in the later stages at elevated temperature, for example 70–100° C. with vigorous agitation of the reaction medium, and it is often advantageous for a proportion of a solvent or swelling agent or both to be present and for the reaction medium to be strongly illuminated. Further, as a large quantity of hydrogen chloride is liberated during the chlorination it is usually preferable to incorporate with the reaction medium small proportions of dispersing or emulsifying agents which are capable of rendering dispersions or emulsions stable in acid media, so that the tendency of the polymer to coagulate in the presence of acidic materials is overcome. Suitable emulsifying and dispersing agents are, for example, the sodium salt of sulphated sperm oil alcohols and sulphonated oleic acid. During the chlorination the polymer remains in suspension or if a solvent or a swelling agent is present remains suspended in the aqueous phase in a dissolved or swollen state. When the chlorination has been effected, excess of chlorine may be removed by air—or nitrogen—blowing the reaction medium after which the solvent or swelling agent may be removed by distillation with or without steam and at atmospheric or reduced pressure, or the water may be removed by adding an organic solvent for the polymer and distilling the mixture under such conditions that the water is removed and a lacquer solution remains. If no solvent or swelling agent is used, the product is usually isolated from the aqueous medium by filtration. Alternatively the chlorinated polymer may be isolated by mixing the reaction medium with a coagulating liquid such as ethanol. The products are conveniently dried at a slightly elevated temperature for example 40 to 80° C., and at atmospheric or reduced pressure.

The products are useful, especially in the form of solutions in organic liquids, for the production of films or other shapes and as ingredients of coating compositions.

As examples of our improved process for preparing chlorinated polyvinyl chloride the following may be given but they are not intended to limit the scope of the invention, all parts being by weight.

Example I 114 parts of an aqueous dispersion of polymerised vinyl chloride (containing 25 parts of the polymer) were diluted with 133 parts of water containing 2.5 parts of the sodium salt of sulphated sperm oil alcohols and then mixed with 200 parts of tetrachloroethane. This liquid was well stirred, maintained at a temperature of 90° C. and illuminated with a 500 watt electric lamp whilst chlorine was passed in at the rate of about 15 parts per hour for 5 hours. The resulting liquid was slowly poured into 900 parts of ethyl alcohol whereupon the chlorinated polyvinyl chloride was precipitated in fibrous form. This product was removed by filtration washed with ethanol and dried. It had a chlorine content of 64.2 per cent and a relative viscosity of 13.3 as measured in a No. 2 Ostwald viscometer using a 2 per cent solution in tetrachloroethane at 20° C.

The aqueous dispersion of polyvinyl chloride was prepared by agitating in an autoclave at 40–45° C. a mixture of vinyl chloride, water, a dispersing agent and polymerisation catalyst. The dispersion contained 22 per cent polyvinyl chloride with a chlorine content of 54.9 per cent and with a K value of 62.9, as measured by the procedure described in British specification No. 485,000.

Example II 114 parts of the aqueous dispersion of polymerised vinyl chloride prepared as described in Example I, were diluted with 137 parts of water. The mixture was illuminated with an electric lamp (500 watts) and stirred at a temperature of 50–60° C. and chlorine was passed in at the rate of 15 parts per hour for 5 hours. The chlorinated polymer was then removed by filtration, washed with water and dried when it was found to have a chlorine content of 59 per cent.

Example III 120 parts of an aqueous dispersion of polymerised vinyl chloride, prepared as described in Example I and containing 25 parts of the polymer, were mixed with 102 parts of water containing 2.5 parts of the sodium salt of sulphated sperm oil alcohols, and 315 parts of ethylene dichloride. The liquid was stirred at a temperature of 80° C., illuminated with a 500 watt electric lamp and chlorine was passed in at the rate of 20 parts per hour for 12 hours. The chlorinated polymer was isolated as described in Example I and contained 63.3 per cent chlorine and had a relative viscosity of 11.2, as measured in a No. 2 Ostwald viscometer using a 2 per cent solution in tetrachloroethane at 20° C.

Example IV

An aqueous dispersion of polyvinyl chloride was prepared and chlorinated as in Example I, except that 120 parts of tetrachloroethane were used. The chlorination was effected at 80° C. and the chlorinated polymer was isolated by blowing steam into the reaction liquid, cooling and filtering. The chlorinated polymer had a chlorine content of 60.4 per cent and was more soluble in tetrachloroethane or ethyl acetate than the original polyvinyl chloride, but it was not sufficiently soluble to form a mobile solution therein at 20° C.

Example V 114 parts of an aqueous dispersion of polymerised vinyl chloride prepared as described in Example I and containing 25 parts of the polymer were mixed with 400 parts of tetrachloroethane. Chlorine was passed into the mixture at the rate of 15 parts per hour for 5 hours, whilst it was stirred and maintained at 85° C. and illuminated with a 500 watt electric lamp. The chlorinated polymer was isolated by adding the emulsion so obtained, in a thin stream to 1000 parts of ethyl alcohol and filtering. The product had a chlorine content of 65.6 per cent by weight and a relative viscosity of 6.7 (as measured in a No. 2 Ostwald viscometer using a 2 per cent solution by weight in tetrachloroethane at 20° C.

Example VI 100 parts of an aqueous dispersion containing 23 parts of polyvinyl chloride and a small amount of a dispersing agent (sulphated methyl oleate) were diluted with 60 parts of water. The mixture was heated to approximately 100° C. and gaseous chlorine was passed in while the mass was stirred and illuminated by a 500 watt lamp. During the first half hour a certain amount of froth was formed but this disappeared and a somewhat coarse precipitate was formed in the liquid. Chlorination was continued for 39½ hours at the same temperature and with continued stirring when the solid produce was filtered off washed with water and dried. The product was a readily soluble chlorinated polyvinyl chloride containing 68.5% $Cl_2$.

Example VII 100 parts of an aqueous dispersion containing 23 parts of polyvinyl chloride and a small amount of a dispersing agent (sulphated methyl oleate) were diluted with 60 parts of water. The mixture was stirred gently, illuminated by a 500 watt lamp and heated to 38° C. while chlorine was passed into the mass. After one hour precipitation started and the temperature was raised to between 90 and 100° C. and was maintained there for a further chlorinating period of 19½ hours. No trouble with frothing was encountered and the solid product, after filtering, washing with water and drying, was readily soluble chlorinated polyvinyl chloride containing 67.0 per cent $Cl_2$.

As various changes might be made in our process without departing from the spirit of our invention, that invention should not be restricted to precise details and conditions, except as necessitated by the appended claims.

We claim:

1. The process for producing a chlorinated polymer of vinyl chloride which comprises preparing an aqueous dispersion of polyvinyl chloride and passing chlorine into said aqueous dispersion in the presence of actinic radiation until the desired degree of chlorination is obtained.

2. The process for producing a chlorinated polymer of vinyl chloride which comprises preparing an aqueous dispersion of polyvinyl chloride containing a dispersing agent capable of maintaining said dispersion in the presence of hydrochloric acid, and passing chlorine into said aqueous dispersion in the presence of actinic radiation until the desired degree of chlorination is obtained.

3. The process for producing a chlorinated polymer of vinyl chloride which comprises preparing an aqueous dispersion of polyvinyl chloride and a chlorinated hydrocarbon which has a solvent action on polyvinyl chloride in the proportion of not more than about 16 parts by weight of said chlorinated hydrocarbon to each part by weight of polyvinyl chloride, and passing chlorine into said aqueous dispersion in the presence of actinic radiation until the desired degree of chlorination is obtained.

4. The process for producing a chlorinated polymer of vinyl chloride which comprises preparing an aqueous dispersion of polyvinyl chloride and a chlorinated hydrocarbon solvent for polyvinyl chloride in the proportion of not more than about 16 parts by weight of said solvent for each part by weight of polyvinyl chloride, said dispersion containing a dispersing agent capable of maintaining said dispersion in the presence of hydrochloric acid, and passing chlorine into said aqueous dispersion in the presence of actinic radiation until the desired degree of chlorination is obtained.

5. The process for producing a chlorinated polymer of vinyl chloride which comprises preparing an aqueous dispersion of polyvinyl chloride and tetrachlorethane in the proportion of not more than about 16 parts by weight of tetrachlorethane for each part by weight of polyvinyl chloride, said dispersion containing a dispersing agent capable of maintaining said dispersion in the presence of hydrochloric acid, and passing chlorine into said aqueous dispersion in the presence of actinic radiation until the desired degree of chlorination is obtained.

6. The process for producing a chlorinated polymer of vinyl chloride which comprises preparing an aqueous dispersion of polyvinyl chloride and ethylene dichloride in the proportion of not more than about 16 parts by weight of ethylene dichloride for each part by weight of polyvinyl chloride, said dispersion containing a dispersing agent capable of maintaining said dispersion in the presence of hydrochloric acid, and passing chlorine into said aqueous dispersion in the presence of actinic radiation until the desired degree of chlorination is obtained.

7. The process for producing a chlorinated polymer of vinyl chloride which comprises preparing an aqueous dispersion of polyvinyl chloride and a chlorinated hydrocarbon which has a solvent action on polyvinyl chloride in the proportion of not more than about 16 parts by weight of said chlorinated hydrocarbon to each part by weight of polyvinyl chloride, said dispersion containing as dispersing agent the sodium salt of sulphated sperm oil alcohols, and passing chlorine into said aqueous dispersion in the presence of actinic radiation until the desired degree of chlorination is obtained.

8. The process for producing a chlorinated polymer of vinyl chloride which comprises preparing an aqueous dispersion of polyvinyl chloride and tetrachlorethane in the proportion of not more than about 16 parts by weight of tetrachlorethane for each part by weight of polyvinyl chloride, said dispersion containing as dispersing agent the sodium salt of sulphated sperm oil alcohols, and passing chlorine into said aqueous dispersion in the presence of actinic radiation until the desired degree of chlorination is obtained.

9. The process for producing a chlorinated polymer of vinyl chloride which comprises preparing an aqueous dispersion of polyvinyl chloride and ethylene dichloride in the proportion of not more than about 16 parts by weight of ethylene dichloride for each part by weight of polyvinyl chloride, said dispersion containing as dispersing agent the sodium salt of sulphated sperm oil alcohols, and passing chlorine into said aqueous dispersion in the presence of actinic radiation until the desired degree of chlorination is obtained.

REGINALD GEORGE ROBERT BACON.
WILLIAM JOHN ROY EVANS.